United States Patent [19]

Hoseney et al.

[11] 4,044,154
[45] Aug. 23, 1977

[54] SALTS OF 6-O-ACYL ASCORBIC ACID FOR YEAST-RAISED BAKED PRODUCTS

[75] Inventors: Russell C. Hoseney; Paul A. Seib; Charles W. Deyoe, all of Manhattan, Kans.

[73] Assignee: The Kansas State University Research Foundation, Manhattan, Kans.

[21] Appl. No.: 632,353

[22] Filed: Nov. 17, 1975

[51] Int. Cl.² .............................................. A21D 2/14
[52] U.S. Cl. ...................................... 426/21; 426/23; 426/24; 426/62; 426/653; 260/343.7
[58] Field of Search ....................... 426/24, 25, 9, 653, 426/331, 335, 532, 21, 23, 62

[56] References Cited

U.S. PATENT DOCUMENTS

| 2,889,227 | 6/1959 | Ofelt ........................................ 426/24 |
| 3,388,996 | 6/1968 | Stockmann et al. .................... 426/25 |
| 3,582,354 | 6/1971 | Kichlive ................................. 426/25 |

Primary Examiner—Joseph M. Golian
Attorney, Agent, or Firm—Schmidt, Johnson, Hovey & Williams

[57] ABSTRACT

Salts of ascorbic acid 6-acylates (both the D-isoascorbic and L-ascorbic isomers) are provided which have significant utility as multi-functional, easily dispersible additives for yeast-leavened doughs or batters and serve as biologically active sources of vitamin C even when added to the dough or batter during preparation thereof and subjected to baking or frying temperatures. The additives hereof are also functional as dough conditioners, anti-staling agents, and shortening sparing agents, and also serve to maintain or even enhance loaf volume in resultant breads and the like and permit incorporation of protein supplements such as soy flour into such products without deleteriously affecting desirable organoleptic properties thereof. The 6-O-acyl ascorbate salts of the invention are compounds of the formula

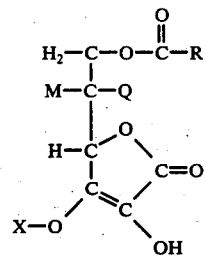

wherein M and Q are different and respectively taken fom the group consisting of —H and —OH, R represents an aliphatic group having from 12 to 18 carbon atoms, inclusive, and X is a salt-forming member selected from the group consisting of sodium, potassium, calcium and magnesium. A method of synthesizing the above acyl ester salts is also provided which includes the step of reacting the free acid form of the ester with a stoichiometric quantity of a base taken from the group consisting of the sodium, potassium, calcium and magnesium compounds of (1) an acid that is a weaker acid than the ester, and (2) an acid which can be removed from the reaction mixture by volatilization. The reaction is carried out in a compatible solvent which dissolves the ester and the reacting base or salt and does not hinder the desired reaction.

12 Claims, No Drawings

SALTS OF 6-O-ACYL ASCORBIC ACID FOR YEAST-RAISED BAKED PRODUCTS

This invention relates to 6-O-acyl ascorbate salts and a method of synthesizing the same wherein the salts serve as multifunctional additives for yeast-leavened doughs or batters. More particularly, it is concerned with the class of such salts which provide biologically active sources of vitamin C when added to doughs or batters prior to baking or frying thereof, and which are functional as easily dispersible dough conditioners, anti-staling agents, and shortening sparing agents, and additives for enhancing loaf volume and permitting incorporation of protein supplements into the doughs or batters in order to yield nutritionally superior end products.

A wide variety of additives have been proposed in the past for incorporation into doughs or batters. In general, such additives are used for specific purposes, e.g., as dough conditioners or anti-staling agents. Exemplary bread dough additives include the well-known monoglycerides and sodium or calcium stearoyl-2-lactylates. In practice, such additives are conventionally incorporated in powder form into the ingredients making up the dough or batter during initial formulation thereof; in this connection, specialized techniques for adding bread additives to increase the dispersibility thereof are generally impractical on a commercial scale in large bakeries.

As can be appreciated, a significant commercial advantage would be obtained if a single additive would be employed to serve a variety of desirable functions, as opposed to separate additions of a number of specific additives. This would be advantageous not only from a processing standpoint, but also because of the fact that it would tend to lessen the total additive solids content in the dough or batter, which is carefully controlled by government regulation. Thus, workers in the art have been searching for additives which can be easily handled and simply added to dough or batter ingredients without specialized mixing techniques and which serve as multifunctional agents in enhancing desirable properties of the raw dough or batter as well as the organoleptic properties of the baked or fried products derived therefrom.

Another problem that has received attention in the past is the lack of an additive which can serve as a biologically active source of vitamin C when added to the dough or batter prior to cooking thereof. Of course, effective vitamin C supplementation is attractive from the standpoint of vitamin fortification, and it is also known that absorption of iron from enriched cereal-based foods is also enhanced by the presence of a vitamin C source. In this connection, it is known that the simple addition of L-ascorbic acid (vitamin C) to bread dough does not give finished breads having high retention of active vitamin C therein, since baking conditions serve to destroy a large percentage of the L-ascorbic acid. It has heretofore been necessary to apply L-ascorbic acid as an aqueous spray to finished bread loaves in order to provide vitamin C supplementation. This is of course a costly proposition to the commercial baker and represents a departure from established practices in vitamin supplementation, and accordingly vitamin C enriched bread has not achieved a significant degree of commercial acceptance.

U.S. Pat. No. 2,889,227 to Ofelt et al discloses the use of ascorbyl palmitate and hydrogenated ascorbyl palmitate as additives for yeast-leavened doughs in order to inhibit staling of the baked products derived therefrom. This patent indicates while the ascorbyl palmitate is an effective anti-staling agent, use thereof in white breads is limited since the additive apparently causes an undesirable, brown-colored crumb in the breads. This of course detracts from the usefulness of such free acid ascorbyl palmitates in breads since crumb appearance is an important organoleptic feature of breads.

It is therefore the most important object of the present invention to provide 6-O-acyl ascorbate salts (both D-isoascorbic and L-ascorbic) which are useful as easily dispersible additives in yeast-leavened dough or batter formulations and which serve to enhance the desirable handling properties of the dough or batter and to enhance organoleptic properties in baked or fried products derived from the additive-supplemented doughs or batters; in addition, the additives hereof are functional as shortening sparing agents permitting reduction of the amount of shortening normally employed in the dough or batters, while also allowing incorporation of protein additives such as soy flour to yield nutritionally superior end products.

Another object of the invention is to provide multifunctional 6-O-acyl-ascorbate salt additives as described which serve as biologically active vitamin C sources which can be added directly to the dough or batter prior to baking or frying thereof without fear that the vitamin C activity of the additives will be destroyed.

Yet another object of the invention is to provide a method of synthesizing the salts of the present invention from the corresponding free acid 6-acylate forms thereof which ensures that a salt-forming metal such as sodium, potassium, calcium or magnesium is selectively placed at the 3-hydroxyl without significant occurrence of undesirable side reactions; in preferred forms, the method comprises dissolving quantities of the free acid ester in an essentially anhydrous organic solvent followed by addition of up to a stoichiometric amount of a base selected from the group consisting of the sodium, potassium, calcium and magnesium compounds of (a) and acid which is weaker (i.e., has a smaller dissociation constant) than the 3-hydroxyl of the ester and (2) and acid which can be removed from the reaction mixture by volatilization thereof. The final step of the method includes recovery of the 3-substituted salt by known means.

One aspect of the present invention involves a method of preparing an improved yeast-leavened dough or batter which includes steps of admixing the normal ingredients making up the dough or batter along with an additive compound of the formula

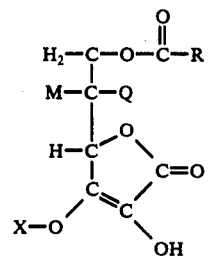

wherein M and Q are different and respectively taken from the group consisting of —H and —OH, R represents an aliphatic group having from 12 to 18 carbon atoms, inclusive, and X is a salt-forming member selected from the group consisting of sodium, potassium, calcium and magnesium. Representative additives of this class include sodium, potassium calcium and magnesium ascorbate 6-palmitate, 6-stearate, 6-myristate and 6-laurate. The D-isoascorbate and L-ascorbate forms of the compounds differ only in the relative positions of the —H and —OH groups at the 5-position (with M in the above formula being —H in the L form), and although the invention embraces the use of both isomeric forms, the L species are in general preferred. As illustrated by the above formula, the salt-forming metal is substituted at the 3-position on the ascorbic acid ring.

In practice, additives in accordance with the invention are added in relatively minor amounts for enhancing or at least substantially maintaining the organoleptic properties of baked or fried goods (e.g., loaf volume, anti-staling qualities) derived therefrom, and also for adding a source of biologically active vitamin C to such products. Addition at substantially any level gives some degree of vitamin supplementation while organoleptic and other improvements are generally obtained at levels of from about 0.25% (baker's weight) and above. It is also generally advantageous to add the compound in an amount for conditioning the dough or batter, although in general this requires an increase over that required for vitamin supplementation and/or minimal enhancement of organoleptic products. In particular, the compounds of the present invention are preferably added at a level of from about 0.25 to 1.5%, more preferably at a level of from about 0.38 to 1.0% (baker's weight), and most preferably at a level of about 0.5% (baker's weight). As can be appreciated, with certain compounds of the above class it may be necessary to add greater or lesser quantities to the dough or batter than with other specific compounds hereof, but the optimum levels in each case can be easily determined. For example, the 6-acylates of D-isoascorbic acid have less vitamin C potency than the L isomers, and accordingly more of the former must in general be used.

It has also been discovered that use of the additives hereof permits reduction or essential elimination of the shortening normally employed in conventional yeast-leavened dough or batter formulation, without a substantial concomitant decrease in the organoleptic properties normally imparted to baked or fried products by the shortening. Furthermore, a protein supplement such as soy flour can advantageously be added to bread doughs or the like which contain the additives of the present invention, and the end products give increased loaf volumes as compared with no-additive, protein supplemented doughs. Other protein supplements useable in this connection include members selected from the group consisting of soy isolates, nonfat milk solids whey products, fish protein concentrate, cottonseed flour, chick-pea flour, sesame seed flour, corn-soy-milk blend flour, wheat protein concentrate, wheat gluten, defatted wheat germ, Torula yeast, wheat-soy blend flour, edible single cell proteins and mixtures thereof. Such supplements are advantageously added in an amount of from 5 to 15% (baker's weight), and more preferably at a level of about 8 to 12% (baker's weight).

The method of synthesizing 3-substituted salts of ascorbate 6-acylates in accordance with the invention broadly includes the steps of dispersing or dissolving a quantity of the corresponding free acid form of the ester having the formula

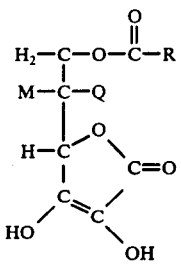

wherein M and Q are different and respectively selected from the group consisting of —H and —OH, and R is an aliphatic group having from 12 to 18 carbon atoms, inclusive, in a compatible, non-interfering solvent. In this respect the solvent is preferably an essentially anhydrous organic solvent, e.g., one of those taken from the group consisting of the ethers, ketones and alcohols and mixtures thereof, and more particularly from the group consisting of diethylether, tetrahydrofuran, acetone, methylethylketone, ethanol, methanol and mixtures thereof.

The next step involves adding to the homogeneous mixture a member taken from the group consisting of the sodium, potassium, calcium and magnesium compounds of (1) an acid that is weaker than the 3-hydroxyl of the free acid ester (i.e., has a smaller dissociation constant) and (2) an acid which can be removed from the reaction mixture by volatilization thereof. The base is added in an amount up to but not substantially exceeding stoichiometric relative to the quantity of free acid ester. In addition, the base employed should be miscible in the solvent in order to facilitate completion of the synthesis reaction. In particular, the base is preferably selected from the group consisting of the alkoxides, phenoxides, acetates, propionates and formates of sodium, potassium, calcium and magnesium.

In carrying out the reaction, no special conditions other than those mentioned above are necessary. For example, the reaction can be run at room temperatures, although in certain instances in order to avoid undesirable organic side reactions the reaction temperature can be lowered to within the range of from about 10 to 20° C. Furthermore, the reaction is preferably carried out at atmospheric pressure.

The final step involves recovery of the 3-substituted salt. This is normally accomplished by evaporating the reaction mixture to dryness under reduced pressure followed by successive additions and reevaporations with absolute ethanol. The resultant products are then dried under reduced pressure and ground to a free flowing powder suitable for direct incorporation without specialized treatment into dough or batter formulations.

The following examples are presented in order to illustrate the present invention, but nothing therein should be taken as limitations upon the scope of the same.

EXAMPLE I

A series of tests were undertaken to determine the anti-staling and other desirable properties of compounds in accordance with the invention when used in bread doughs. The bread in each case was produced using a straight dough procedure with the following formula:

TABLE I

| | | |
|---|---|---|
| Flour | 100 g | (14% M.B.) |
| Sugar | 6 | |
| Nonfat dry mild solids | 4 | |
| Salt | 1.5 | |
| Vegetable shortening | 3.0 | (except as otherwise noted) |
| Malt syrup 60° L | 0.5 | |
| Yeast | 2.0 | |
| Potassium Bromate | Optimum | |
| Water | Optimum | |

The doughs were mixed to optimum, fermented at 30° C. and 90% relative humidity for 180 minutes, with mechanical punching after 105 and 155 minutes. The doughs were then machine molded and proofed for 55 minutes and baked at 218° C. for 25 minutes. Within 3 minutes after removing from the oven, the loaf volume was determined by the rapeseed displacement method. For any set of conditions sufficient loaves were baked to determine optimum water and potassium bromate in the formula. All test additives were directly mixed as dry powders with the dough ingredients at the levels specified in Table II below.

In order to determine the anti-staling effects of the additives tested, the loaves were cooled to room temperature, and those loaves to be used for each day's readings were placed in a plastic bag and the bag sealed. The bread was stored at room temperature (25° C.) until the measurements were made. A 1¾ inch cube of bread was cut from the approximate center of each loaf and Gelometer readings were taken on the cube. Readings were taken on the side of the cube that corresponded to the top and each side of the loaf of bread. A number of readings were averaged to obtain a value for each load, and in each study at least duplicate loaves were used for each treatment. The result of this series of tests are set forth in Table II.

A study of the table will demonstrate that addition of compounds in accordance with the invention to breads gives a resistance to staling which in most cases exceeds that of the monoglyceride additive, which is a conventional anti-staling agent in widespread use. For example, bread baked with sodium 6-O-palmitoyl-L-ascorbate at 0.5% (baker's weight) gave better staling readings at 1 and 5 days than the monoglyceride tests, and these results are substantially duplicated with the remaining test additives. It is also of interest that in Test No. 1 using sodium 6-O-palmitoyl-L-ascorbate at 0.5% (baker's weight) and no shortening, the results indicated a significantly softer loaf at 1, 3 and 5 days after baking.

Furthermore, a study of the first four entries in Table II will demonstrate that the anti-staling results with the compounds hereof are actually enhanced when shortening is omitted. This is to be contrasted with conventional cases with shortening only and shortening plus monoglycerides. In these tests resistance to staling was increased with the shortening-monoglyceride combination, while with compounds of the present invention the no-shortening loaves gave superior anti-staling results.

In sum therefore, it is clear that bread supplemented with the additives of the present invention exhibit enhanced anti-staling properties and moreover can be produced with reduced or eliminated shortening levels.

TABLE II

| Test No. | [1]Additive Compound | Amount Added | Shortening | Day 1 Reading | [2]Difference | [3]Relative Effect % | Day 3 Reading | Difference | Relative Effect % | Day 5 Reading | Difference | Relative Effect % |
|---|---|---|---|---|---|---|---|---|---|---|---|---|
| 1 | None-Control | — | 3.0 | 108g | 0 | 0 | 179g | 0 | 0 | 275g | 0 | 0 |
| 1 | [4]Monoglycerides | 0.5 | 3.0 | 99 | 9 | 100 | 147 | 32 | 100 | 251 | 24 | 100 |
| 1 | Sodium 6-O-palmitoyl- L-ascorbate | 0.5 | 3.0 | 86 | 22 | 244 | 162 | 17 | 53 | 248 | 27 | 120 |
| 1 | Sodium 6-O-palmitoyl- L-ascorbate | 0.5 | — | 78 | 30 | 330 | 132 | 47 | 147 | 206 | 69 | 330 |
| 2 | None-Control | — | 3.0 | 99 | 0 | 0 | 173 | 0 | 0 | 281 | 0 | 0 |
| 2 | [4]Monoglycerides | 0.5 | 3.0 | 103 | fn | — | 164 | 9 | 100 | 233 | 48 | 100 |
| 2 | Sodium 6-O-palmitoyl- L-ascorbate | 0.5 | — | 79 | fn | — | 121 | 52 | 578 | 175 | 106 | 221 |
| 2 | Sodium 6-O-lauroyl- L-ascorbate | 0.5 | — | 93 | fn | — | 159 | 14 | 156 | 212 | 69 | 144 |
| 2 | Sodium 6-O-stearoyl- L-ascorbate | 0.5 | — | 90 | 5 | — | 145 | 28 | 310 | 205 | 76 | 158 |
| 3 | None-Control | — | 3.0 | 124 | 0 | 0 | 184 | 0 | 0 | 270 | 0 | 0 |
| 3 | [4]Monoglycerides | 0.5 | 3.0 | 111 | 13 | 100 | 166 | 18 | 100 | 246 | 24 | 100 |
| 3 | Sodium 6-O-myristoyl- L-ascorbate | 0.25 | — | 115 | 11 | 85 | 190 | 6 | 33 | 240 | 30 | 125 |
| 3 | Sodium 6-O-myristoyl- L-ascorbate | 0.50 | — | 97 | 27 | 208 | 148 | 36 | 200 | 202 | 62 | 258 |
| 3 | Sodium 6-O-myristoyl- L-ascorbate | 0.75 | — | 88 | 36 | 277 | 123 | 61 | 339 | 175 | 71 | 296 |
| 3 | Sodium 6-O-myristoyl- L-ascorbate | 1.00 | — | 82 | 42 | 323 | 124 | 60 | 333 | 206 | 40 | 167 |

[1]Amounts of additive added and shortening levels given in terms of baker's weight.
[2]Differences relative to no-additive control.
[3]Relative effect given in terms of percentage, based upon monoglyceride anti-staling readings taken as 100% under the control.
[4]Monoglyceride used was a commercially sold additive marketed by Distillation Products Industries under the tradename "Myverol".
[5]No relative effectiveness calculated since control loaf gave softer reading after 1 day than monoglyceride loaf.

EXAMPLE II

A series of examples werre undertaken to demonstrate that the additives hereof remain biologically active as sources of Vitamin C even when baked in breads.

First of all, samples of bread identical with those described in Example I were prepared but with the addition of 1.5% (baker's weight) of sodium 6-O-palmitoyl-L-ascorbate added to the dough ingredients during mixing thereof. Subsequent to baking, samples of the bread were air-dried over night and ground in a small hammer mill so that at least 50% of the bread passed through a 13xx silk sieve cloth. 250 mg of sodium lauryl sulfate and 50 ml of alpha-amylase solution containing 5,000 units of enzyme activity (one unit of activity is the amount of enzyme that releases 1.0 mg of maltose from soluble starch in 3 minutes at 20° C. and pH of 6.9). were added to 2 grams of the ground sample in a 125ml Erlenmeyer flask. The mixture was then incubated in a water bath at 48° C. for 60 minutes, whereupon a 25 micromilliliter aliquot was removed and injected into a liquid chromatograph equipped with a 2.3× 1,000mm stainless steel column packed with Bondapak-$C_{18}$ on Porasil (Waters Associates Incl, Milford, Mass.). The reverse-phase column was developed using a 1:1 mixture (v/v) of methanol-water and the column eluant was monitered by its absorbance of ultraviolet light (254mm). Using a standard curve, it was determined that approximately 80% of the original amount of sodium 6-O-palmitoyl-L-ascorbate added to the bread dough was still present.

In order to further demonstrate the biological activity of the present compounds in baked bread, an in vivo test was undertaken wherein five groups of guinea pigs (seven pigs each) were fed varying diets in order to determine the scurvy-inhibiting effects of bread treated with the compounds of the present invention. In particular, each of the test groups was fed the following basic test diet:

TABLE III

| BASIC TEST DIET | |
|---|---|
| Casein | 29.7g |
| L-Arginine HCl | 0.3 |
| Bread (10% moisture) | 38.5 |
| Corn Oil | 3.0 |
| Cellulose | 15.0 |
| Mineral premix | 7.5 |
| Vitamin premix | 6.0 |
| | 100.0g |

The control group of animals was fed the above diet without vitamin C supplementation. The bread fed the ascorbic acid group was sprayed after baking with an aqueous spray of ascorbic acid at a level of 50 mg of vitamin C per 100 gm of diet. In the remaining three test groups the respective test compounds (sodium 6-O-palmitoyl-L-ascorbate, sodium 6-O-stearoyl-L-ascorbate, and sodium 6-O-lauroyl-L-ascorbate) were directly added as a powder to the bread dough ingredients prior to baking thereof and at a level to give the equivalent of 50 mg of ascorbic acid per 100 gm total diet. The bread was prepared exactly as that described in Example I, save for the addition of the test compounds. The pigs were penned 2, 2 and 3 per cage, and feed consumption and weight gain or loss was recorded weekly.

The total feed consumed and weight gain or loss for each of the respective test groups is set forth in the following Table IV:

TABLE IV

| Treatment | Total Feed Consumed (g) | Total Weight Gain or Loss (g) | Scurvy Symptoms |
|---|---|---|---|
| Basic Diet-Control | 3809 | −929 | [2]Severe |
| [1]L-ascorbic acid | 7177 | +515 | None |
| Sodium 6-O-palmitoyl-L-ascorbate | 9064 | +605 | None |
| Sodium 6-O-stearoyl-L-ascorbate | 7193 | +290 | None |
| Sodium 6-O-lauroyl-L-ascorbate | 7352 | +280 | None |

[1]Aqueous solution of L-ascorbic acid sprayed onto bread after baking.
[2]Test interrupted at the end of 4 weeks because of scurvy symptoms.

As can be seen from the foregoing, the pigs fed the basic diet developed severe scurvy symptoms after a period of four weeks, causing interruption of this test. The remaining test groups exhibited no scurvy symptoms during the entire five week test period. This demonstrates that addition of the compounds of the present invention to bread dough prior to baking thereof serves as the functional equivalent of spraying ascorbic acid onto the bread subsequent to baking thereof. Thus, it will be clear that the additives in accordance with the present invention retain biological activity even under baking conditions.

EXAMPLE III

This example is presented to demonstrate the dough conditioning and shortening sparing qualities of the additives hereof when added to bread doughs, and the effects thereof on load volumes. The doughs were produced exactly as explained in Example I with a series of test additives being added thereto at the levels set forth in Table V hereunder. Dough conditioning effects were determined from handling properties of the doughs during punching and molding thereof, while shortening sparing properties were determined from comparative load volume and dough conditioning data.

Reference is particularly made to Test 1 wherein sodium 6-O-palmitoyl-L-ascorbate is added at varying levels between 0.25 and 1.0% (baker's weight). Dough conditioning effects are seen at a level of 0.38% (baker's weight), and excellent conditioning occurs at levels of about 0.50% (baker's weight) and above. It is believed that for substantial dough conditioning purposes a level of from about 0.38 to about 1.0% (baker's weight) is preferred, although for other organoleptic properties and resistance to staling, a broader range of from about 0.25 to 1.5% (baker's weight) is useful.

Attention is also directed to Test 2 in Table V wherein sodium 6-O-valeroyl-L-ascorbate and sodium 6-O-sebacoyl-L-ascorbate, sodium 2-O-palmitoyl-L-ascorbate and sodium 2-O-oleoyl-L-ascorbate are employed. These four additives of course are not within the scope of the present invention and the dough conditioning and loaf volume readings demonstrate that these compounds do not give the desirable properties of the additives in accordance with the invention. Similar tests using sodium 6-O-caproyl-L-ascorbate ($C_{10}$) also gave poor results in terms of loaf volume and dough conditioning. Furthermore, the free acid form of L-ascorbate 6-palmitate was also tested in this series of runs. In one instance wherein the free acid was added in the manner of the additives of the present invention (i.e., as a powder and mixed directly in with the remaining dough ingredients without special techniques), the loaf volume was deficient, the crust had a number of unappetizing black specks thereon and the bread exhibited an undesirable color which would lessen its eye appeal.

a procedure is not commercially feasible for large scale bakeries.

Finally, a study of Table V will demonstrate the marked shortening sparing properties of the additives hereof. In particular, the loaf volume for the shortening-added loaves is substantially the same as the loaf volume for loaves baked without shortening but with from about 0.38% (baker's weight) and above of the compounds of the present invention. Note in this respect that the comparative runs using compounds outside the scope of the invention (footnote 2, Table V) gave poor loaf volumes even when used at the most advantageous level, i.e., 0.50% (baker's weight). In

TABLE V

| Test No. | Additive | Additive Amount (baker's wt) | Shortening (baker's wt) | Water Absorption | KBrO$_3$ | Loaf Volume | Dough Conditioning |
|---|---|---|---|---|---|---|---|
| 1 | No Additive-Control | — | 3.0g | 63.0% | 20 ppm | 990 cc | 0 |
| 1 | No Additive-Control | — | — | 65.0 | 20 | 905 | — |
| 1 | Sodium 6-O-palmitoyl-L-ascorbate | 0.25 | — | 65.0 | 20 | 885 | — |
| 1 | Sodium 6-O-palmitoyl-L-ascorbate | 0.38 | — | 65.5 | 20 | 945 | + |
| 1 | Sodium 6-O-palmitoyl-L-ascorbate | 0.50 | — | 66.0 | 20 | 990 | +++ |
| 1 | Sodium 6-O-palmitoyl-L-ascorbate | 0.75 | — | 66.0 | 30 | 995 | ++ |
| 1 | Sodium 6-O-palmitoyl-L-ascorbate | 1.00 | — | 67.0 | 30 | 975 | + |
| 2 | No Additive-Control | — | 3.0 | 63.0 | 20 | 988 | 0 |
| 2 | [1]Monoglycerides | 0.50 | 3.0 | 64.0 | 20 | 971 | 0 |
| 2 | Sodium 6-O-palmitoyl-L-ascorbate | 0.50 | — | 66.0 | 20 | 997 | +++ |
| 2 | Sodium 6-O-lauroyl-L-ascorbate | 0.50 | — | 66.0 | 20 | 1015 | ++++ |
| 2 | Sodium 6-O-stearoyl-L-ascorbate | 0.50 | — | 66.0 | 20 | 968 | ++ |
| 2 | Sodium 6-O-myristoyl-L-ascorbate | 0.50 | — | 66.0 | 20 | 995 | +++ |
| 2 | Sodium 6-O-myristoyl-D-isoascorbate | 0.50 | — | 66.0 | 20 | 975 | +++ |
| 2 | [2]Sodium 6-O-valeroyl-L-ascorbate | 0.50 | — | 65.0 | 20 | 740 | — |
| 2 | [2]Sodium 6-O-sebacoyl-L-ascorbate | 0.50 | — | 64.0 | 20 | 720 | — |
| 2 | [2]Sodium 2-O-palmitoyl-L-ascorbate | 0.50 | — | 65.0 | 20 | 740 | — |
| 2 | [2]Sodium 2-O-oleoyl-L-ascorbate | 0.50 | — | 65.5 | 30 | 793 | — |
| 2 | [3]6-O-palmitoyl-L-ascorbic acid | 0.50 | — | 66.0 | 20 | 900 | ++ |
| 2 | [4]6-O-palmitoyl-L-ascorbic acid | 0.50 | — | 66.0 | 20 | 925 | ++ |
| 2 | [5]6-O-palmitoyl-L-ascorbic acid | 0.50 | — | 66.0 | 20 | 985 | +++ |

[1]Commercially sold monoglyceride marketed under the tradename "Myverol".
[2]Valeroyl, R=5; Sebacoyl, R=—OCO(CH$_2$)$_8$COOH, and 2-acyl substituted species tested for comparison purposes.
[3]Additive dissolved in 2 ml of ethanol and added as a liquid to dough formulation.
[4]Free acid form added to dough formulation; resultant bread had black specks on crust.
[5]Free acid form finely ground into bread flour prior to making dough.

In another case the L-ascorbic acid 6-palmitate was micropulverized and thoroughly admixed with the flour component of the bread prior to mixing of the bread dough ingredients. This increased loaf volume and dough conditioning characteristics due to increased dispersion of the additive, but as mentioned above such addition, it will be seen that use of sodium 6-O-myristoyl-D-isoascorbate also gave loaf volume results substantially equal to shortening-added bread, and moreover this compound, like the L-ascorbate isomer, also exhibits dough conditioning properties.

EXAMPLE IV

In order to demonstrate the superiority of the additive salts of the present invention over the corresponding free acid forms thereof, another test was undertaken. In this instance 5 separate bread runs were made as set forth in Example I. The first control run contained no additive and 3.0% (baker's weight) shortening, the second run likewise was additive free but had not shortening, the third and fourth runs contained no shortening but did contain 0.5% (baker's weight) of 6-O-palmitoyl-L-ascorbic acid (free acid), and the fifth run contained 0.5% (baker's weight) of sodium 6-palmitoyl-L-ascorbate. In runs 3 and 5 the additives were simply admixed with the dough ingredients, while in run 4 the 6-O-palmitoyl-L-ascorbic acid was finely ground together with the flour in a high speed mixer.

After baking, the surfaces of the loaves were scanned visually to determine the number of black specks on the surfaces thereof. The readings were taken at random across the surface of each loaf, using a piece of cardboard having a two centimeter square opening therein. Runs, 1, 2, 4 and 5 exhibited no discernible specks at all on the surfaces thereof, while Run 3 (6-O-palmitoyl-L-ascorbic acid directly admixed in the normal manner) had an average of 9 ± 0.9 black specks per square centimeter on the loaf surface. In addition, the loaf volume in run 4 was approximately 11% less than in the other runs.

EXAMPLE V

A comparative test was run to determine the effects of using additives in accordance with the invention in breads containing protein supplements. As is well known to those skilled in this art, use of protein supplements such as soy flour in general tends to lessen the desirable organoleptic properties of the finished breads including loaf volume thereof. In this test two comparative breads were prepared as set forth in Example I, with 12% (baker's weight) soy flour being added as a protein supplement. In one case 1% (baker's weight) sodium L-ascorbate 6-palmitate was added to the bread in order to determine the effect of such addition, with an additive-free control likewise being run for comparative purposes.

TABLE VI

| $^{1,2}$Soy Flour | Additive | $^2$Additive Amount | Absorption | KBrO$_3$ | Loaf Volume |
|---|---|---|---|---|---|
| 12.0% | — | — | 77.0 | 50 | 645cc |
| 12.0 | Sodium 6-O-palmitoyl-L-ascorbate | 1.00% | 79.0 | 50 | 730 |

$^1$Soy flour used was the Ardex 550 product sold by The Archer Daniels Midland Company of Minneapolis, Minnesota.
$^2$Figures given in terms of baker's weight.

As can be seen from the above table, use of 1% (baker's weight) of sodium 6-O-palmitoyl-L-ascorbate serves to significantly increase loaf volume even in the presence of soy flour as a protein supplement. In addition, other organoleptic properties of the additive bread were not deleteriously affected by the presence of the soy flour.

EXAMPLE VI

This example is presented to demonstrate the preferred synthesis method for producing the 3-substituted salts of 6-O-acyl-L-ascorbate hereof.

The 6-palmitate ester of L-ascorbic acid (0.012 mole) was dissolved in warm dry acetone (60 ml). To the mixture was added slowly, with stirring and cooling (10°–15° ), 0.8–1.0 equivalents of sodium methoxide (1 M solution in methanol), during which time sodium 6-O-palmitoyl-L-ascorbate precipitated from the reaction mixture. The mixture was evaporated to dryness under reduced pressure below 50°. Absolute ethanol was added to the residue and evaporated. After another addition and evaporation of ethanol the residue was dried under vacuum over anhydrous calcium sulfate at 60°, and was ground to a fine powder; yield 4.9 g (93%). Sodium 6-O-palmitoyl-L-ascorbate could also be isolated by filtration and washing with absolute ethanol.

The same procedure was followed to produce the sodium, potassium and magnesium salts of the other 6-acyl esters of L-ascorbic acid.

The calcium salts were generated by stirring a mixture of the 6-acyl ester of L-ascorbic acid (5 g) with one equivalent of calcium propionate in absolute ethanol (50 ml) for 12 hours. Ethanol was removed by evaporation and the residue dried under vacuum over sodium hydroxide pellets to remove propionic acid. This alternative method could also be used to produce the sodium salt using sodium propionate in dry methanol or the magnesium salt using magnesium acetate.

Having thus described the invention, what is claimed as new and desired to be secured by Letters Patent is:

1. A method of preparing an improved yeast-leavened dough or batter comprising the steps of:
   admixing the ingredients making up the yeast-leavened dough or batter; and
   adding to said dough or batter prior to the baking or frying thereof from about 0.25 to 1.5% (baker's weight) of a compound of the formula

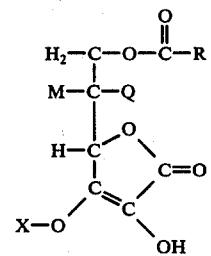

wherein M and Q are different and respectively taken from the group consisting of —H and —OH, R represents an aliphatic group having from 12 to 18 carbon atoms, inclusive, and X is a salt-forming member selected from the group consisting of sodium, potassium, calcium and magnesium.

2. The method of claim 1 wherein said dough or batter is essentially free of shortening.

3. The method of claim 1 wherein said compound is added at a level of from about 0.38 to 1.0% (baker's weight).

4. The method of claim 3 wherein said compound is added at a level of about 0.5% (baker's weight).

5. The method of claim 1 including the step of admixing a protein supplement with said ingredients.

6. The method of claim 5 wherein said protein supplement is selected from the group consisting of soy flour, soy isolates, nonfat milk solids, whey products, fish protein concentrate, cottonseed flour, chick-pea flour, sesame seed flour, flour containing respective quantities of corn flour, soy flour and milk, wheat protein concentrate, wheat gluten, defatted wheat germ, Torula yeast, flour containing respective quantities of wheat and soy flours, edible single cell proteins, and mixtures thereof.

7. An improved, yeast-leavened dough or batter composition which comprises:

an admixture of the ingredients necessary for said yeast-leavened dough or batter; and from about 0.25 to 1.5% (baker's weight) of a compound admixed with said ingredients and of the formula

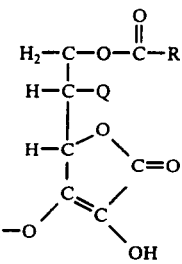

wherein M and Q are different and respectively taken from the group consisting of —H and —OH, R represents an aliphatic group having from 12 to 18 carbon atoms, inclusive, and X is a salt-forming member selected from the group consisting of sodium, potassium, calcium and magnesium.

8. The composition of claim 7 wherein said dough or batter is essentially free of shortening.

9. The composition of claim 7 wherein said compound is added at a level of from about 0.38 to 1.0% (baker's weight).

10. The composition of claim 9 wherein said compound is added at a level of about 0.5% (baker's weight).

11. The composition of claim 7 including a protein supplement is admixed with said ingredients.

12. The composition of claim 1 wherein said protein supplement is selected from the group consisting of soy flour, soy isolates, nonfat milk solids, whey products, fish protein concentrate, cottonseed flour, chick-pea flour, sesame seed flour, flour containing respective quantities of corn flour, soy flour and milk, wheat protein concentrate, wheat gluten, defatted wheat germ, Torula yeast, flour containing respective quantities of wheat and soy flours, edible single cell proteins, and mixtures thereof.

* * * * *